Aug. 22, 1933.   R. GOLDSCHMIDT   1,923,368
SHAFT COUPLING WITH POWER STORAGE
Original Filed Feb. 14, 1924
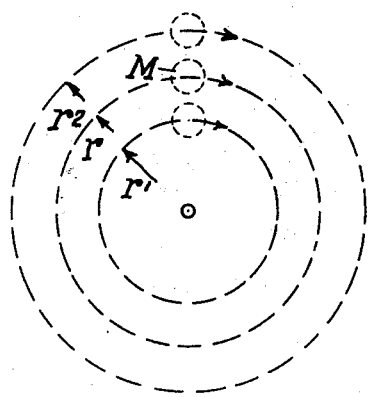
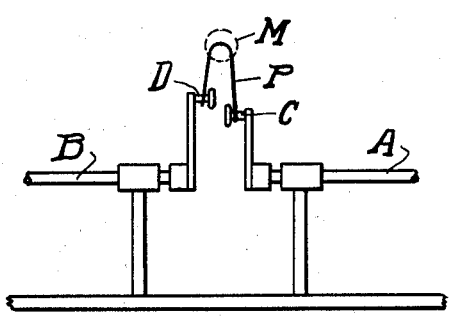
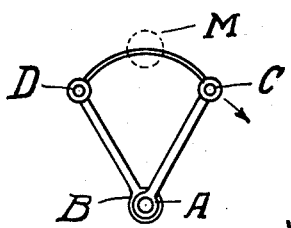
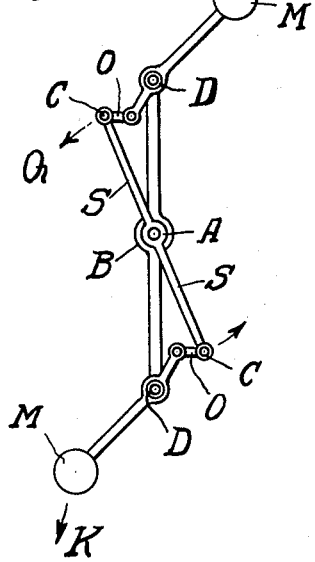
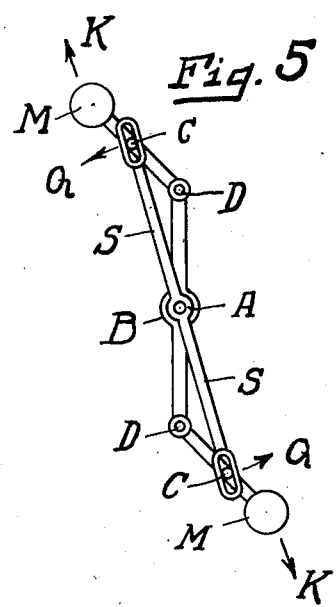
INVENTOR
Rudolf Goldschmidt
BY
John B. Brady
ATTORNEY Patented Aug. 22, 1933

1,923,368

UNITED STATES PATENT OFFICE 1,923,368

SHAFT COUPLING WITH POWER STORAGE

Rudolf Goldschmidt, Charlottenburg, Germany, assignor, by mesne assignments, to Nathan Kann, New York, N. Y.

Original application February 14, 1924, Serial No. 692,873, now Patent No. 1,758,439. Divided and this application January 29, 1930. Serial No. 424,393

3 Claims. (Cl. 64—97)

My invention refers to coupling devices between rotating shafts with an arrangement for power storage, whereby a resilient coupling can be secured. The subject matter of this application is a division of application Serial No. 692,873 filed on February 14, 1924, now Patent 1,758,439.

If two shafts are to be connected by means of a flexible coupling two cases must be distinguished. In the one case, a relatively small amount of vibration is taken up by the coupling, the coupling serving in the manner of a vibration insulator or absorber between the two shafts. An ordinary coupling with slight flexibility utilizing springs, leather, or resilient material would serve quite well for such insulating purpose. However, the case is quite different if the coupling has the function of a regular accumulator of power, to an amount which forms a high percentage of the energy transmitted from one shaft to the other. Then the coupling becomes a storage apparatus, often of the same importance as the motor and the driven machine themselves. The use of very strong springs has the disadvantage that the material, after a certain time, deteriorates or fatigues and that the springs take up a relatively large space and offer unusual constructional difficulties.

The object of this invention is to provide a mechanism or mechanisms which avoid the use of springs and allows storage of power with comparatively very small weights which occupy very little space and which can be so arranged with respect to a system of shafts as to have as much or greater elastic properties as springs might possess.

Another object is to utilize the centrifugal force of a fly-weight. This fly-weight may be pivoted to a lever, a flange or an arm fixed to one of the shafts and rotating with it, the radius of rotation of this fly-weight being altered corresponding to the power transmitted by means of connecting rods or other elements for obtaining the same effect, the same means connecting the fly-weight to a flange or arm fixed to the second shaft.

In order that the invention may be more clearly understood, reference is hereinafter made to the accompanying drawing, wherein:—

Fig. 1 is an elemental diagram showing a fly-weight, rotating in different concentric circles.

Figs. 2 and 3 are views of two shafts coupled together and illustrating the general principle of the invention.

Fig. 4 is a side view of a coupling embodying the principle of my invention, and Fig. 5 is a side view of another preferred embodiment of the principle of my invention.

Referring to Fig. 1, the physical principle used in this invention is that a weight M rotating at a certain angular velocity in a circle with the radius $r$, alters the energy stored in its mass, or withdrawn from it, if the radius is reduced to $r'$ or increased to $r^2$, the reduction and increase of the radius of rotation being effected by the pulsation of angular velocity of the two shafts relative to one another.

Figs. 2 and 3 show elemental applications of the invention, wherein A is the driving shaft, B the driven shaft. Two pivots C and D are attached to the shafts, eccentric to their center of rotation. The pivots C and D are connected for instance by a flexible cable P. The cable P may carry a weight M.

Fig. 4 illustrates a side view of an arrangement where the fly-weights M are attached to the pivots D in connection with one of the shafts B, and where the radius of the fly-weights is altered by means of levers S in connection with the other shaft A and connecting links O.

Fig. 5 is a slight modification of Fig. 4 where the connecting links O are eliminated and replaced by a slit in the levers S, in which the pivot C of the arms of the weights M can slide. These lever constructions are shown for illustrative purposes and are not intended as limiting my invention. The choice of the arrangements depends on the practical conditions, especially on the amount of regulation and power required.

In this latter arrangement, it will be seen that if the driving torque is applied to the shaft A in counter-clockwise direction, this torque will be communicated through the pivot C to the fly-weight link M and through the pivots D to the shaft B. As the shafts gain speed, the centrifugal action on the fly-weights M will tend to throw them out and when this centrifugal action exceeds the torque, the pin C will assume an intermediate position as illustrated in the diagram. When the shaft is operated in this intermediate position, any change in torque opposing the rotation of the shaft B will result in a sliding action of the pivot C either inwards or outwards, depending on whether this opposing torque has increased or decreased. In either case, the fly-weights M will tend to assume a new position, wherein their centrifugal forces will oppose the torque transmitted through its coupling.

While I have described preferred embodiments of my invention, I desire that it be understood that equivalents may be employed and that no limitations upon the invention are intended other than are imposed by the scope of the following claims:—

What I claim is:

1. Mechanism for coupling together two shafts with a connection resilient by virtue of centrifugal forces comprising a lever arm, mounted on one end of said shafts, fly-weights pivoted to the ends of said lever, a second lever mounted on said other shaft, slots on said second lever, pivots on said first lever for co-operating with said slots to form a lost motion connection between said arms, said fly-weights being free to change their radius of rotation under the influence of centrifugal forces except as restrained by the turning moment communicated from one shaft to the other through said lost motion connection.

2. Mechanism for coupling together two rotating shafts with a connection resilient by virtue of centrifugal forces comprising eccentric pivots on one of said shafts, fly-weights arranged to rotate freely on said pivots and coupling means to said second shaft including a sliding connection with increasing radius whereby the fly-weights are restrained from movement due to centrifugal forces by the forces at said sliding connection resulting from the torque communicated through said coupling.

3. Mechanism for coupling together two rotating shafts with a connection resilient by virtue of centrifugal forces comprising eccentric pivots on one of said shafts, fly-weights arranged to rotate freely on said pivots and coupling means to said second shaft including a sliding guide on said second shaft, a member on the said fly-weight engaging in said guide and co-operating therewith, whereby the torque communicated through said coupling means is opposed by centrifugal forces due to said fly-weights.

RUDOLF GOLDSCHMIDT.